(12) United States Patent
Seo et al.

(10) Patent No.: US 11,584,861 B2
(45) Date of Patent: *Feb. 21, 2023

(54) SEPARATOR FOR RECHARGEABLE BATTERY AND RECHARGEABLE LITHIUM BATTERY INCLUDING THE SAME

(71) Applicant: SAMSUNG SDI CO., LTD., Yongin-si (KR)

(72) Inventors: Dongwan Seo, Suwon-si (KR); Changhong Ko, Suwon-si (KR); YangSeob Kim, Suwon-si (KR); Yongkyoung Kim, Suwon-si (KR); Sam-Jin Park, Suwon-si (KR); Jinkyu Park, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 8 days.

This patent is subject to a terminal disclaimer.

(21) Appl. No.: 15/596,258

(22) Filed: May 16, 2017

(65) Prior Publication Data

US 2017/0338461 A1    Nov. 23, 2017

(30) Foreign Application Priority Data

May 17, 2016   (KR) .................. 10-2016-0060152

(51) Int. Cl.
*H01M 50/44*        (2021.01)
*H01M 50/403*      (2021.01)
(Continued)

(52) U.S. Cl.
CPC ................ *C09D 7/61* (2018.01); *C08J 7/043* (2020.01); *C08J 7/0427* (2020.01); *C08K 3/22* (2013.01);
(Continued)

(58) Field of Classification Search
CPC .... H01M 2/1626; H01M 2/145; H01M 2/166; H01M 2/1666; H01M 2/1686;
(Continued)

(56) References Cited

U.S. PATENT DOCUMENTS 4,574,110 A    3/1986 Asano et al.
8,492,021 B2   7/2013 Kaun
(Continued)

FOREIGN PATENT DOCUMENTS

AU    2002314302 B2   12/2002
CN       1328102 A    12/2001
(Continued)

OTHER PUBLICATIONS

International Search Report of PCT/KR2018/005568 dated Aug. 24, 2018.

(Continued)

*Primary Examiner* — Allison Bourke
*Assistant Examiner* — Kourtney R S Carlson
(74) *Attorney, Agent, or Firm* — Lee IP Law, P.C.

(57) ABSTRACT

A separator for a rechargeable battery includes a porous substrate and a heat resistance layer on at least one surface of the porous substrate. The heat resistance layer includes an acryl-based copolymer, an alkali metal, and a filler. The acryl-based copolymer includes a unit derived from (meth) acrylate or (meth)acrylic acid, a cyano group-containing unit, and a sulfonate group-containing unit.

14 Claims, 5 Drawing Sheets

(51) Int. Cl.

| | | |
|---|---|---|
| *H01M 50/411* | (2021.01) | |
| *H01M 50/446* | (2021.01) | |
| *H01M 50/449* | (2021.01) | |
| *H01M 50/429* | (2021.01) | |
| *H01M 50/42* | (2021.01) | |
| *H01M 50/417* | (2021.01) | |
| *H01M 10/0525* | (2010.01) | |
| *C09D 7/61* | (2018.01) | |
| *C08J 7/04* | (2020.01) | |
| *C08J 7/043* | (2020.01) | |
| *C08K 3/22* | (2006.01) | |
| *C09D 5/18* | (2006.01) | |
| *C09D 133/20* | (2006.01) | |
| *H01M 4/131* | (2010.01) | |
| *H01M 4/133* | (2010.01) | |
| *H01M 4/505* | (2010.01) | |
| *H01M 4/525* | (2010.01) | |
| *H01M 4/62* | (2006.01) | |
| *H01M 4/66* | (2006.01) | |
| *H01M 10/052* | (2010.01) | |
| *H01M 50/46* | (2021.01) | |
| *H01M 4/02* | (2006.01) | |

(52) U.S. Cl.
CPC .............. *C09D 5/18* (2013.01); *C09D 133/20* (2013.01); *H01M 4/131* (2013.01); *H01M 4/133* (2013.01); *H01M 4/505* (2013.01); *H01M 4/525* (2013.01); *H01M 4/623* (2013.01); *H01M 4/624* (2013.01); *H01M 4/661* (2013.01); *H01M 10/0525* (2013.01); *H01M 50/403* (2021.01); *H01M 50/411* (2021.01); *H01M 50/417* (2021.01); *H01M 50/42* (2021.01); *H01M 50/4295* (2021.01); *H01M 50/44* (2021.01); *H01M 50/446* (2021.01); *H01M 50/449* (2021.01); *C08J 2323/06* (2013.01); *C08J 2433/20* (2013.01); *C08K 2003/2227* (2013.01); *H01M 10/052* (2013.01); *H01M 50/461* (2021.01); *H01M 2004/027* (2013.01); *H01M 2004/028* (2013.01)

(58) Field of Classification Search
CPC ...... H01M 4/131; H01M 4/133; H01M 4/505; H01M 4/525; H01M 4/623; H01M 4/624; H01M 4/661; H01M 50/4295; H01M 50/403; H01M 50/44; H01M 50/446; H01M 50/449; H01M 50/411; C09D 7/61; C09D 5/18; C09D 133/20; C08J 7/047
USPC ............................................. 429/144
See application file for complete search history.

(56) References Cited

U.S. PATENT DOCUMENTS

| | | | |
|---|---|---|---|
| 9,293,753 | B2 | 3/2016 | Toyoda |
| 10,205,147 | B2 | 2/2019 | Park et al. |
| 2004/0171014 | A1 | 9/2004 | Smith |
| 2011/0027642 | A1* | 2/2011 | Lee .................... B01D 67/0079 429/145 |
| 2011/0081601 | A1 | 4/2011 | Weber et al. |
| 2011/0159362 | A1 | 6/2011 | Wakizaki et al. |
| 2013/0017429 | A1* | 1/2013 | Ha .................... H01M 50/449 429/144 |
| 2013/0171499 | A1 | 7/2013 | Yang et al. |
| 2013/0252066 | A1 | 9/2013 | Yeou et al. |
| 2013/0302661 | A1 | 11/2013 | Kim et al. |
| 2014/0030578 | A1 | 1/2014 | Hoshiba et al. |
| 2014/0045033 | A1 | 2/2014 | Zhang |
| 2014/0107275 | A1* | 4/2014 | Uemura ................ H01M 2/166 524/503 |
| 2014/0186680 | A1 | 7/2014 | Kim |
| 2015/0140402 | A1 | 5/2015 | Kim et al. |
| 2015/0263325 | A1 | 9/2015 | Honda et al. |
| 2016/0013465 | A1* | 1/2016 | Akiike ................ H01M 2/145 429/144 |
| 2016/0149190 | A1 | 5/2016 | Fukuchi |
| 2016/0164059 | A1 | 6/2016 | Hong et al. |
| 2016/0190536 | A1* | 6/2016 | Park ........................ C08J 7/043 429/144 |
| 2016/0233475 | A1 | 8/2016 | Son et al. |
| 2016/0351873 | A1 | 12/2016 | Sasaki |
| 2017/0133654 | A1 | 5/2017 | Cho et al. |
| 2017/0338461 | A1 | 11/2017 | Seo et al. |

FOREIGN PATENT DOCUMENTS

| | | |
|---|---|---|
| CN | 101641808 A | 2/2010 |
| CN | 101946344 A | 1/2011 |
| CN | 102015083 A | 4/2011 |
| CN | 102640329 A | 8/2012 |
| CN | 103325975 A | 9/2013 |
| CN | 103390740 A | 11/2013 |
| CN | 104521028 A | 4/2015 |
| CN | 104521031 A | 4/2015 |
| CN | 105018001 A | 11/2015 |
| CN | 105027325 A | 11/2015 |
| CN | 105040150 A | 11/2015 |
| CN | 105637677 A | 6/2016 |
| JP | 02-063788 | 3/1990 |
| JP | 06-172725 | 6/1994 |
| JP | WO2010-024328 A1 | 3/2010 |
| JP | 2011-108444 A | 6/2011 |
| JP | 2012-099324 A | 5/2012 |
| JP | 5148142 B2 | 2/2013 |
| JP | 5323590 B2 | 10/2013 |
| JP | 2014-149935 A | 8/2014 |
| JP | 2014-175055 A | 9/2014 |
| JP | 5601472 B2 | 10/2014 |
| JP | 2014-225410 A | 12/2014 |
| JP | 2014-229427 A | 12/2014 |
| JP | 5647378 B2 | 12/2014 |
| JP | 2015-88253 | 5/2015 |
| JP | 2015-088253 A | 5/2015 |
| JP | 2015-115321 A | 6/2015 |
| JP | 2015-118908 A | 6/2015 |
| JP | 2015-162312 A | 9/2015 |
| JP | 2015-185353 A | 10/2015 |
| JP | 2015-536030 A | 12/2015 |
| JP | 5844950 B2 | 1/2016 |
| JP | 2016-062689 A | 4/2016 |
| JP | 5920441 B2 | 4/2016 |
| JP | 2016-105398 A | 6/2016 |
| JP | 2016-216550 | 12/2016 |
| KR | 10-2012-0097238 | 9/2012 |
| KR | 10-1187767 B1 | 9/2012 |
| KR | 10-1247248 | 3/2013 |
| KR | 10-2013-0035215 | 4/2013 |
| KR | 10-1301595 B1 | 8/2013 |
| KR | 10-2013-0107550 A | 10/2013 |
| KR | 10-2014-0003404 | 1/2014 |
| KR | 10-2014-0004156 | 1/2014 |
| KR | 10-1365300 B1 | 2/2014 |
| KR | 10-2014-0044757 | 4/2014 |
| KR | 10-2014-0044757 A | 4/2014 |
| KR | 10-1453785 B1 | 10/2014 |
| KR | 10-1470696 B1 | 12/2014 |
| KR | 10-2015-0042216 A | 4/2015 |
| KR | 10-2015-0043703 | 4/2015 |
| KR | 10-2015-0057481 | 5/2015 |
| KR | 10-1529758 | 6/2015 |
| KR | 10-2015-0084116 A | 7/2015 |
| KR | 10-2015-0106811 A | 9/2015 |
| KR | 10-1551757 B1 | 9/2015 |
| KR | 10-2016-0051199 | 5/2016 |
| KR | 10-2016-0069431 A | 6/2016 |
| KR | 10-2016-0072162 A | 6/2016 |

(56) References Cited

FOREIGN PATENT DOCUMENTS

| KR | 10-2016-0115599 | A | | 10/2016 | |
|----|-----------------|---|---|---------|---|
| KR | 10-2017-0053448 | A | | 5/2017 | |
| WO | WO 2012/011555 | A1 | | 1/2012 | |
| WO | WO 2012/029805 | A1 | | 3/2012 | |
| WO | WO 2014-148577 | A1 | | 9/2014 | |
| WO | WO-2014148577 | A1 | * | 9/2014 | ............. C08L 33/00 |
| WO | WO 2013/125645 | A1 | | 7/2015 | |
| WO | WO 2017-033431 | A1 | | 3/2017 | |

OTHER PUBLICATIONS

European Search Report dated Aug. 9, 2017, of the corresponding European Patent Application No. 17171385.2.
International Search Report for PCT/KR2018/005568 filed on May 15, 2018.
USPTO Office action dated Jan. 3, 2020, in U.S. Appl. No. 15,982,380.
U.S. Office action issued in U.S. Appl. No. 16/100,099 dated Dec. 12, 2019.
U.S. Office action issued in U.S. Appl. No. 16/100,099 dated Sep. 11, 2020.
U.S. Office action issued in U.S. Appl. No. 16/100,099 dated Mar. 19, 2021.
Nicolas Fedelich, "Application Handbook Thermal Analysis of Polymers Selected Applications Thermal Analysis", Jan. 1, 2013, XP055608279, Retrieved from the Internet.
European Search Report dated Jan. 22, 2021.
U.S. Office action in co pending related U.S. Appl. No. 16/100,099 dated Jul. 16, 2021.
Chinese Office action dated Apr. 6, 2021.
U.S. Notice of Allowance received in co-pending U.S. Appl. No. 16/603,649 dated Dec. 22, 2021.
U.S. Office action received in co pending U.S. Appl. No. 16/603,649 dated Aug. 18, 2021.
U.S. Office action from Co Pending U.S. Appl. No. 16/100,099 dated Apr. 27, 2022.
Chinese Office action dated Sep. 17, 2021.
U.S. Office action receiving in co-pending U.S. Appl. No. 16/100,099.
U.S. Appl. No. 15/982,380, filed May 17, 2018.
U.S. Office Action received in co pending U.S. Appl. No. 16/100,099 dated Aug. 25, 2022.
U.S. Office Action received in related U.S. Appl. No. 16/100,099 dated Dec. 19, 2022.

* cited by examiner

SEPARATOR FOR RECHARGEABLE BATTERY AND RECHARGEABLE LITHIUM BATTERY INCLUDING THE SAME

CROSS-REFERENCE TO RELATED APPLICATION

Korean Patent Application No. 10-2016-0060152, filed on May 17, 2016, in the Korean Intellectual Property Office, and entitled: "Separator for Rechargeable Battery and Rechargeable Lithium Battery Including the Same," is incorporated by reference herein in its entirety.

BACKGROUND

1. Field

Embodiments are directed to separator for a rechargeable battery and a rechargeable lithium battery including the same.

2. Description of the Related Art

A separator for an electrochemical battery is an intermediate film that separates a positive electrode and a negative electrode in a battery, and maintains ion conductivity continuously to enable charge and discharge of a battery.

SUMMARY

Embodiments are directed to a separator for a rechargeable battery including a porous substrate and a heat resistance layer on at least one surface of the porous substrate. The heat resistance layer includes an acryl-based copolymer, an alkali metal, and a filler. The acryl-based copolymer includes a unit derived from (meth)acrylate or (meth)acrylic acid, a cyano group-containing unit, and a sulfonate group-containing unit.

The unit derived from (meth)acrylate or (meth)acrylic acid may be represented by Chemical Formula 1, Chemical Formula 2, Chemical Formula 3, or a combination thereof:

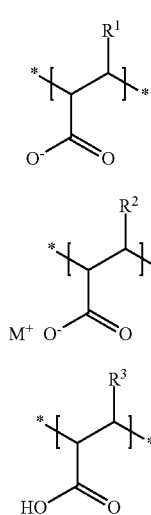

[Chemical Formula 1]

[Chemical Formula 2]

[Chemical Formula 3]

wherein, in Chemical Formula 1 to Chemical Formula 3, $R^1$, $R^2$, and $R^3$ are independently hydrogen or a methyl group and in Chemical Formula 2, M is an alkali metal.

The cyano group-containing unit may be represented by Chemical Formula 4:

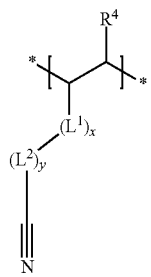

[Chemical Formula 4]

wherein, in Chemical Formula 4, $R^4$ is hydrogen or a C1 to C3 alkyl group, $L^1$ is —C(=O)—, —C(=O)O—, —OC(=O)—, —O—, or —C(=O)NH—, x is an integer ranging from 0 to 2, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and y is an integer ranging from 0 to 2.

The sulfonate group-containing unit may be represented by Chemical Formula 5, Chemical Formula 6, Chemical Formula 7, or a combination thereof:

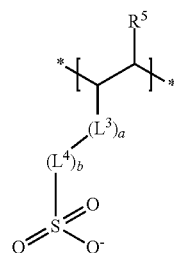

[Chemical Formula 5]

[Chemical Formula 6]

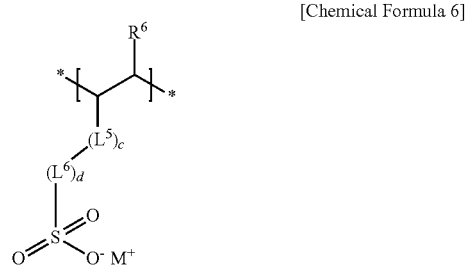

[Chemical Formula 7]

wherein, in Chemical Formula 5 to Chemical Formula 7, $R^5$, $R^6$, and $R^7$ are independently hydrogen or a C1 to C3 alkyl group, $L^3$, $L^5$, and $L^7$ are independently —C(=O)—, —C(=O)O—, —OC(=O)—, —O—, or —C(=O)NH—, $L^4$, $L^6$, and $L^8$ are independently substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and a, b, c, d, e, and f are independently an integer ranging from 0 to 2, and in Chemical Formula 6, M' is an alkali metal.

In the acryl-based copolymer, the sulfonate group-containing unit may be included in an amount of about 0.1 mol % to about 20 mol %.

In the acryl-based copolymer, the unit derived from (meth)acrylate or (meth)acrylic acid may be included in an amount of about 10 mol % to about 70 mol %. The cyano group-containing unit may be included in an amount of about 30 mol % to about 85 mol %. The sulfonate group-containing unit is included in an amount of about 0.1 mol % to about 20 mol %.

A weight average molecular weight of the acryl-based copolymer may be about 200,000 to about 700,000.

A glass transition temperature of the acryl-based copolymer may be about 200° C. to about 280° C.

In the heat resistance layer, the acryl-based copolymer may be included in an amount of about 1 wt % to about 30 wt %.

The alkali metal may be included in an amount of about 1 wt % to about 40 wt % based on a total weight of the alkali metal and the acryl-based copolymer.

The filler may be included in an amount of about 70 wt % to about 99 wt % based on the heat resistance layer.

The filler may include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

A thickness of the heat resistance layer may be about 1 μm to about 5 μm.

After the separator is allowed to stand at about 130° C. to about 170° C. for about 20 minutes to about 70 minutes, a shrinkage ratio of the separator in each of a machine direction (MD) and a traverse direction (TD) is less than or equal to about 5%.

Embodiments are also directed to a rechargeable lithium battery including a positive electrode, a negative electrode, and the separator as described above disposed between the positive electrode and the negative electrode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
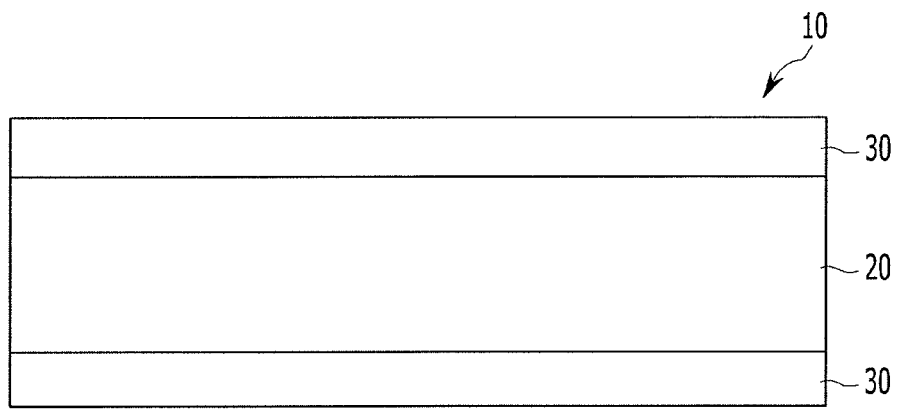
FIG. 1 illustrates a cross-sectional view showing a separator for a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration.

Hereinafter, as used herein, when a definition is not otherwise provided "substituted" refers to replacement of hydrogen of a compound by a substituent selected from a C1 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (F, Cl, Br, or I), a hydroxy group (—OH), a nitro group (—$NO_2$), a cyano group (—CN), an amino group (—NRR' wherein R and R' are independently hydrogen or a C1 to C6 alkyl group), a sulfobetaine group ((—RR'$N^+(CH_2)_nSO_3^-$), a carboxyl betaine group (—RR'$N^+(CH_2)_nCOO^-$) wherein R and R' are independently a C1 to C20 alkyl group), an azido group (—$N_3$), an amidino group (—C(=NH)$NH_2$), a hydrazino group (—$NHNH_2$), a hydrazono group (=N($NH_2$)), an aldehyde group (—C(=O)H), a carbamoyl group (—C(O)$NH_2$), a thiol group (—SH), an ester group (—C(=O)OR, wherein R is a C1 to C6 alkyl group or a C6 to C12 aryl group), a carboxyl group (—COOH) or a salt thereof (—C(=O)OM, wherein M is an organic or inorganic cation), a sulfonic acid group (—$SO_3H$) or a salt thereof (—$SO_3M$, wherein M is an organic or inorganic cation), a phosphoric acid group (—$PO_3H_2$) or a salt thereof (—$PO_3MH$ or —$PO_3M_2$, wherein M is an organic or inorganic cation), and a combination thereof.

Hereinafter, a C1 to C3 alkyl group may be a methyl group, an ethyl group, or a propyl group. A C1 to C10 alkylene group may be, for example, a C1 to C6 alkylene group, a C1 to C5 alkylene group, or a C1 to C3 alkylene group, and may be for example, a methylene group, an ethylene group, or a propylene group. A C3 to C20 cycloalkylene group may be, for example, a C3 to C10 cycloalkylene group, or a C5 to C10 alkylene group, and may be, for example, a cyclohexylene group. A C6 to C20 arylene group may be, for example, a C6 to C10 arylene group, and may be, for example, a benzylene group or a phenylene group. A C3 to C20 heterocyclic group may be, for example, a C3 to C10 heterocyclic group, and may be, for example, a pyridine group.

Hereinafter, "hetero" refers to one including at least one heteroatom selected from N, O, S, Si, and P.

Hereinafter, the term "combination thereof" refers to a mixture, a copolymer, a blend, an alloy, a composite, or a reaction product of components.

In addition, in chemical formulas, "*" refers to a point of attachment to an atom, a group, or a unit that may be the same or different.

Hereinafter, "an alkali metal" refers to an element of Group 1 of Periodic Table 1, for example, lithium, sodium, potassium, rubidium, cesium, or francium, and may be present in a cation state or neutral state.

Hereinafter, a separator for a rechargeable battery according to an embodiment is described. FIG. 1 illustrates a view showing a separator for a rechargeable battery according to an embodiment. Referring to FIG. 1, a separator 10 for a rechargeable battery according to an embodiment includes a porous substrate 20 and a heat resistance layer 30 disposed on one surface or both surfaces of the porous substrate 20.

The porous substrate 20 may have a plurality of pores and may be a general porous substrate used in an electrochemical device. Examples of the porous substrate 20 may include a polymer film formed of a polymer, or a copolymer or a mixture of two or more selected from polyolefin such as polyethylene, polypropylene, or the like, a polyester such as polyethylene terephthalate, polybutylene terephthalate, or the like, polyacetal, polyamide, polyimide, polycarbonate, polyetheretherketone, polyaryletherketone, polyetherimide, polyamideimide, polybenzimidazole, polyether sulfone, polyphenylene oxide, a cyclic olefin copolymer, polyphenylene sulfide, polyethylene naphthalate, a glass fiber, Teflon, or polytetrafluoroethylene.

The porous substrate 20 may be, for example, a polyolefin-based substrate. A polyolefin-based substrate may improve safety of a battery due to its improved shut-down function. The polyolefin-based substrate may be selected from, for example, a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate 20 may have a thickness of about 1 μm to about 40 μm, or, for example, about 1 μm to about 30 μm, about 1 μm to about 20 μm, about 5 μm to about 15 μm, or about 10 μm to about 15 μm.

The heat resistance porous layer 30 according to an embodiment may include an acryl-based copolymer, an alkali metal, and a filler.

The heat resistance layer 30 may have improved heat resistance due to the inclusion of the filler, which may prevent abrupt shrinkage or deformation of a separator due to increase of a temperature. The filler may be, for example, an inorganic filler, an organic filler, an organic/inorganic filler, or a combination thereof. The inorganic filler may be a ceramic material capable of improving heat resistance, for example, a metal oxide, a semi-metal oxide, a metal fluoride, a metal hydroxide, or a combination thereof. The inorganic filler may be, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, as examples. The organic filler may include an acrylic compound, an imide compound, an amide compound, or a combination thereof, as examples. The organic filler may have, for example, a core-shell structure.

The filler may have a spherical shape, a sheet-shape, a cubic-shape, or an amorphous shape. An average particle diameter of the filler may be in a range of about 1 nm to about 2,500 nm, or, for example, about 100 nm to about 2,000 nm or, for example, about 200 nm to about 1,000 nm, or, for example about 300 nm to about 800 nm. The term "average particle diameter of the filler" may refer to a particle size ($D_{50}$) at a volume ratio of 50% in a cumulative size-distribution curve. By using the filler having an average particle diameter within the ranges, the heat resistance layer 30 may have an appropriate strength, and the separator 10 may have improved heat resistance, durability, and stability.

The filler may be provided by mixing two or more different kinds of fillers or two or more fillers having different sizes.

The filler may be included in an amount of about 50 wt % to about 99 wt % of the heat resistance layer 30. In an embodiment, the filler may be included in an amount of about 70 wt % to about 99 wt %, or, for example, about 80 wt % to about 99 wt %, about 85 wt % to about 99 wt %, about 90 wt % to about 99 wt %, or about 95 wt % to about 99 wt % of the heat resistance layer 30. When the filler is included within the ranges, the separator 10 may have improved heat resistance, durability, oxidation resistance, and stability.

The alkali metal may be present in a cation state and may be, for example, lithium, sodium, potassium, rubidium, or cesium. The alkali metal may be bonded with the acryl-based copolymer that will be described below and thus may be present in a form of a salt. The alkali metal may help a synthesis of the acryl-based copolymer in an aqueous solvent, may improve adherence of the heat resistance layer 30, and also may improve heat resistance, air permeability, and oxidation resistance of the separator 10.

The alkali metal may be included in an amount of about 1 wt % to about 40 wt %, or, for example, about 1 wt % to about 30 wt %, or, for example, about 1 wt % to about 20 wt %, or, for example about 10 wt % to about 20 wt % based on a total weight of the alkali metal and the acryl-based copolymer.

The alkali metal may be included in an amount of about 0.1 mol % to about 1.0 mol % based on a total of the alkali metal and the acryl-based copolymer.

When the alkali metal is included within the ranges, it is possible to assist the synthesis of the acrylic copolymer in the aqueous solvent, and as a result, the heat resistance layer 30 may have improved adherence, and the separator 10 including the same may exhibit excellent heat resistance, air permeability, and oxidation resistance.

The acryl-based copolymer may include a unit derived from (meth)acrylate or (meth)acrylic acid, a cyano group-containing unit, and a sulfonate group-containing unit. The acryl-based copolymer may play a role of fixing the filler on the porous substrate 20, and may simultaneously provide an adhesion force to adhere the heat resistance layer 30 on the porous substrate 20 and the electrode, and may contribute to an improvement of heat resistance, air permeability, and oxidation resistance of the separator 10.

In the unit derived from (meth)acrylate or (meth)acrylic acid, the (meth)acrylate may be a conjugate base of a (meth)acrylic acid, a (meth)acrylate salt, or a derivative thereof. The unit derived from (meth)acrylate or (meth)acrylic acid may be represented by, for example, Chemical Formula 1, Chemical Formula 2, Chemical Formula 3, or a combination thereof.

[Chemical Formula 1]

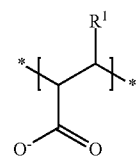

[Chemical Formula 2]

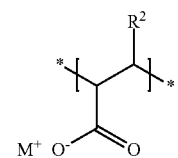

[Chemical Formula 3]

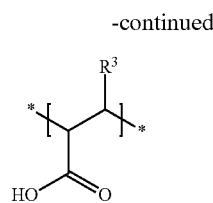

In Chemical Formula 1 to Chemical Formula 3 $R^1$, $R^2$, and $R^3$ are independently hydrogen or methyl group and in Chemical Formula 2, M is an alkali metal. The alkali metal may be, for example, lithium, sodium, potassium, rubidium, or cesium.

For example, the unit derived from (meth)acrylate or (meth)acrylic acid may include a unit represented by Chemical Formula 2 and a unit represented by Chemical Formula 3. The unit represented by Chemical Formula 2 and the unit represented by Chemical Formula 3 may be included in a mole ratio of about 10:1 to about 1:2, or, for example, about 10:1 to about 1:1, or about 5:1 to about 1:1.

The unit derived from (meth)acrylate or (meth)acrylic acid may be included in an amount of about 10 mol % to about 70 mol %, or, for example about 20 mol % to about 60 mol %, about 30 mol % to about 60 mol %, or about 40 mol % to about 55 mol % based on the acryl-based copolymer. When the units are included within the ranges, the acryl-based copolymer and the separator 10 including the same may exhibit excellent adherence, heat resistance, air permeability, and oxidation resistance.

The cyano group-containing unit may be represented by, for example, Chemical Formula 4.

[Chemical Formula 4]

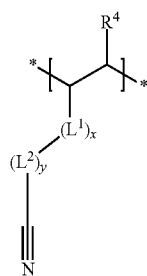

In Chemical Formula 4, $R^4$ is hydrogen or a C1 to C3 alkyl group, $L^1$ is —C(=O)—, —C(=O)O—, —OC(=O)—, —O—, or —C(=O)NH—, x is an integer ranging from 0 to 2, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and y is an integer ranging from 0 to 2.

The cyano group-containing unit may be, for example, a unit derived from (meth)acrylonitrile, alkenenitrile, cyanoalkyl(meth)acrylate, or 2-(vinyloxy)alkane nitrile. As examples, the alkene of the alkenenitrile may be a C1 to C20 alkene, a C1 to C10 alkene, or a C1 to C6 alkene, the alkyl of the cyanoalkyl(meth)acrylate may be a C1 to C20 alkyl, a C1 to C10 alkyl, or a C1 to C6 alkyl, and the alkane of the 2-(vinyloxy)alkane nitrile may be a C1 to C20 alkane, a C1 to C10 alkane, or a C1 to C6 alkane.

The alkene nitrile may be, for example, allyl cyanide, 4-pentene nitrile, 3-pentene nitrile, 2-pentene nitrile, or 5-hexene nitrile, or the like. The cyanoalkyl(meth)acrylate may be, for example, cyanomethyl(meth)acrylate, cyanoethyl(meth)acrylate, cyanopropyl(meth)acrylate, or cyanooctyl (meth)acrylate. The 2-(vinyloxy)alkanenitrile may be, for example, 2-(vinyloxy)ethane nitrile, or 2-(vinyloxy)propane nitrile.

The cyano group-containing unit may be included in an amount of about 30 mol % to about 85 mol %, or, for example, about 30 mol % to about 70 mol %, about 30 mol % to about 60 mol %, or about 35 mol % to about 55 mol % based on the acryl-based copolymer. When the cyano group-containing unit is included within the ranges, the acryl-based copolymer and the separator 10 including the same may ensure excellent oxidation resistance and exhibit adherence, heat resistance, and air permeability.

The sulfonate group-containing unit may be a unit including a conjugate base of a sulfonic acid, a sulfonate salt, a sulfonic acid, or a derivative thereof. For example, the sulfonate group-containing unit may be represented by Chemical Formula 5, Chemical Formula 6, Chemical Formula 7, or a combination thereof.

[Chemical Formula 5]

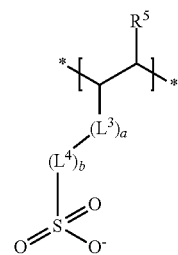

[Chemical Formula 6]

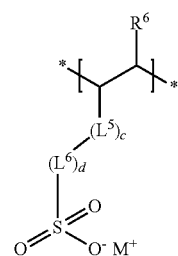

[Chemical Formula 7]

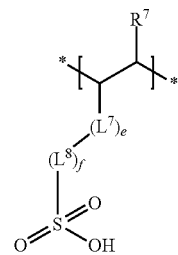

In Chemical Formula 5 to Chemical Formula 7, $R^5$, $R^6$, and $R^7$ are independently hydrogen or a C1 to C3 alkyl group, $L^3$, $L^5$, and $L^7$ are independently —C(=O)—, —C(=O)O—, —OC(=O)—, —O—, or —C(=O)NH—, $L^4$, $L^6$, and $L^8$ are independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and a, b, c, d, e, and f are independently an integer ranging from 0 to 2, and in Chemical Formula 6, M' is an alkali metal.

For example, in Chemical Formula 5 to Chemical Formula 7 $L^3$, $L^5$, and $L^7$ may be independently —C(=O)NH—, $L^4$, $L^6$, and $L^8$ may be independently a C1 to C10 alkylene group, and a, b, c, d, e, and f may be 1.

The sulfonate group-containing unit may include one of a unit represented by Chemical Formula 5, a unit represented by Chemical Formula 6, and a unit represented by Chemical Formula 7 or two or more thereof. For example, the sulfonate group-containing unit may include a unit represented by Chemical Formula 6 or, as another example, the sulfonate group-containing unit may include a unit represented by Chemical Formula 6 and a unit represented by Chemical Formula 7.

The sulfonate group-containing unit may be, for example, a unit derived from vinyl sulfonic acid, allyl sulfonic acid, styrene sulfonic acid, anethole sulfonic acid, acryl amidoalkane sulfonic acid, sulfoalkyl (meth)acrylate, or a salt thereof.

For example, the alkane of the acryl amidoalkane sulfonic acid may be C1 to C20 alkane, C1 to C10 alkane, or C1 to C6 alkane and the alkyl of the sulfoalkyl (meth)acrylate may be C1 to C20 alkyl, C1 to C10 alkyl, or C1 to C6 alkyl. The salt may be a salt of the sulfonic acid and an appropriate ion. The ion may be, for example, an alkali metal ion. For example, the salt may be an alkali metal sulfonate salt.

The acryl amidoalkane sulfonic acid may be, for example, 2-acrylamido-2-methylpropane sulfonic acid. The sulfoalkyl (meth)acrylate may be, for example, 2-sulfoethyl (meth)acrylate, 3-sulfopropyl (meth)acrylate, or the like.

The sulfonate group-containing unit may be included in an amount of about 0.1 mol % to about 20 mol %, for example about 0.1 mol % to about 10 mol %, or about 1 mol % to about 20 mol % based on the acryl-based copolymer. When the sulfonate group-containing unit is included within the ranges, the acryl-based copolymer and the separator 10 including the same may exhibit improved adherence, heat resistance, air permeability, and oxidation resistance.

The acryl-based copolymer may be represented by, for example, Chemical Formula 11.

[Chemical Formula 11]

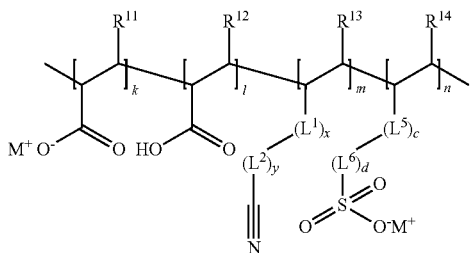

In Chemical Formula 11, $R^{11}$ and $R^{12}$ are independently hydrogen or a methyl group, $R^{13}$ and $R^{14}$ are independently hydrogen or a C1 to C3 alkyl group, $L^1$ and $L^5$ are independently —C(=O)—, —C(=O)O—, —OC(=O)—, —O—, or —C(=O)NH—, $L^2$ and $L^6$ are independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, x, y, c, and d are independently an integer ranging from 0 to 2, M is an alkali metal such as lithium, sodium, potassium, rubidium, or cesium, and the like, and k, l, m, and n denote a mole ratio of each unit.

For example, in Chemical Formula 11, k+l+m+n=1. For example, $0.1 \le (k+l) \le 0.5$, $0.4 \le m \le 0.85$ and $0.001 \le n \le 0.2$, for example $0.1 \le k \le 0.5$ and $0 \le l \le 0.25$.

For example, in Chemical Formula 11, x=y=0, $L^5$ is —C(=O)NH—, $L^6$ is a C1 to C10 alkylene group, and c=d=1.

In the acryl-based copolymer, a substitution degree of the alkali metal ($M^+$) may be about 0.5 to about 1.0, or, for example, about 0.6 to about 0.9, or about 0.7 to about 0.9 relative to (k+n). When the substitution degree of the alkali metal satisfies the ranges, the acryl-based copolymer and the separator 10 including the same may exhibit excellent adherence and heat resistance, and oxidation resistance.

The acryl-based copolymer may further include other units in addition to the units described above. For example the acryl-based copolymer may further include a unit derived from alkyl(meth)acrylate, a unit derived from a diene-based monomer, a unit derived from a styrene-based monomer, an ester group-containing unit, a carbonate group-containing unit, or a combination thereof.

The acryl-based copolymer may have various forms, such as, for example, an alternating polymer where the units are alternately distributed, a random polymer the units are randomly distributed, or a graft polymer where a part of structural unit is grafted.

A weight average molecular weight of the acryl-based copolymer may be about 200,000 to about 700,000, or, for example, about 200,000 to about 600,000, or about 300,000 to about 700,000. When the weight average molecular weight of the acryl-based copolymer satisfies the ranges, the acryl-based copolymer and the separator 10 including the same may exhibit excellent adherence, heat resistance, air permeability, and oxidation resistance. The weight average molecular weight may be, for example, a polystyrene-reduced average molecular weight measured by gel permeation chromatography.

A glass transition temperature of the acryl-based copolymer may be about 200° C. to about 280° C., or, for example about 210° C. to about 270° C., or about 210° C. to about 260° C. When the glass transition temperature of the acryl-based copolymer satisfies the ranges, the acryl-based copolymer and the separator 10 including the same may exhibit excellent adherence, heat resistance, air permeability, and oxidation resistance. The glass transition temperature may be measured by, for example, differential scanning calorimetry.

The acryl-based copolymer may be prepared by a suitable method such as emulsion polymerization, suspension polymerization, or solution polymerization.

The acryl-based copolymer may be included in an amount of about 1 wt % to about 30 wt %, for, or example about 1 wt % to about 20 wt %, about 1 wt % to about 15 wt %, or about 1 wt % to about 10 wt % of the total weight of the heat resistance layer 30. When the acryl-based copolymer is included in the heat resistance layer 30 within the ranges, the separator 10 may exhibit excellent heat resistance, adherence, air permeability, and oxidation resistance.

In some implementations, the heat resistance layer 30 may further include a cross-linkable binder having a cross-linking structure in addition to the acryl-based copolymer. The cross-linkable binder may be obtained from a monomer, an oligomer, and/or a polymer having a curable functional group capable of reacting with heat and/or light. For example, the cross-linkable binder may be a multi-functional monomer, a multi-functional oligomer, and/or a multi-functional polymer having at least two curable functional groups. The curable functional groups may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof, as examples.

The cross-linkable binder may be obtained from a monomer, an oligomer and/or a polymer including at least two (meth)acrylate groups. For example, the cross-linkable binder may include ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri(meth)acrylate, pentaerythritol tetra(meth)acrylate, diglycerine hexa(meth)acrylate, or a combination thereof.

The cross-linkable binder may be obtained from a monomer, an oligomer and/or a polymer including at least two epoxy groups. For example, the cross-linkable binder may include bisphenol A diglycidyl ether, bisphenol F diglycidyl ether, hexahydrophthalic acid glycidyl ester, or a combination thereof.

For example, the cross-linkable binder may be obtained from a monomer, an oligomer and/or a polymer including at least two isocyanate groups. For example, the cross-linkable binder may include diphenylmethane diisocyanate, 1,6-hexamethylene diisocyanate, 2,2,4(2,2,4)-trimethyl hexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, or a combination thereof.

In addition, the heat resistance layer 30 may further include a non-cross-linkable binder in addition to the acryl-based copolymer. The non-cross-linkable binder may be, for example, a vinylidene fluoride-based polymer, polymethylmethacrylate, polyacrylonitrile, polyvinylpyrrolidone, polyvinylalcohol, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, an acrylonitrile-styrene-butadiene copolymer, or a combination thereof.

The vinylidene fluoride-based polymer may be, for example, a homopolymer including only a vinylidene fluoride monomer-derived unit or a copolymer of a vinylidene fluoride-derived unit and an other monomer-derived unit. For example, the copolymer may include a vinylidene fluoride-derived unit and at least one unit derived from chlorotrifluoroethylene, trifluoroethylene, hexafluoropropylene, ethylene tetrafluoride or ethylene monomers. For example, the copolymer may be a polyvinylidene fluoride-hexafluoropropylene (PVdF-HFP) copolymer including a vinylidene fluoride monomer-derived unit and a hexafluoropropylene monomer-derived unit.

For example, the non-cross-linkable binder may be a polyvinylidene fluoride (PVdF) homopolymer, a polyvinylidene fluoride-hexafluoropropylene (PVdF-HFP) copolymer, or a combination thereof. Adherence between the porous substrate 20 and the heat resistance layer 30 may be increased, stability of the separator 10 and impregnation properties of an electrolyte solution may be improved, and thus, high-rate charge and discharge characteristics of a battery may be improved.

The heat resistance layer 30 may have a thickness of about 0.01 µm to 20 µm, or, for example, about 1 µm to about 10 µm, about 1 µm to about 5 µm, or about 1 µm to about 3 µm.

A ratio of a thickness of the heat resistance layer 30 relative to a thickness of the porous substrate 20 may be about 0.05 to about 0.5, or, for example about 0.05 to about 0.4, or about 0.05 to about 0.3, or about 0.1 to about 0.2. The separator 10 including the porous substrate 20 and the heat resistance layer 30 may exhibit excellent air permeability, heat resistance, and adherence.

The separator 10 for a rechargeable battery according to an embodiment may have excellent heat resistance. For example, the shrinkage ratio in a machine direction (MD) and a traverse direction (TD) of the separation membrane 10 measured after leaving the separation membrane 10 in a temperature range of 130° C. or more and 170° C. or less for 20 minutes to 70 minutes may be 5% or less, respectively. Also, the separator 10 may have a shrinkage ratio of less than or equal to about 5% or less than or equal to about 4% at a high temperature. For example, after the separator 10 is allowed to stand at about 150° C. for about 60 minutes, the shrinkage ratio of the separator 10 in each of the machine direction (MD) and the traverse direction (TD) may be less than or equal to about 5% or less than or equal to about 4%.

In a general separator, when a heat resistance layer is thick, a shrinkage ratio at a high temperature may be lowered. However, the separator 10 according to an embodiment may realize a shrinkage ratio at a high temperature of less than or equal to about 5% even when a thickness of the heat resistance layer 30 is about 1 µm to about 5 µm, or about 1 µm to about 3 µm.

In addition, the separator 10 for a rechargeable battery according to an embodiment may resist breaking and deformation, and the shape of the separator 10 may be stably maintained at a high temperatures of greater than or equal to about 200° C., for example about 200° C. to about 250° C.

The separator 10 for a rechargeable battery according to an embodiment may exhibit excellent air permeability, For example, air permeability may be less than about 200 sec/100 cc, or, for example, less than or equal to about 190 sec/100 cc, or less than or equal to about 160 sec/100 cc. Herein air permeability refers to a time (second) until the separator passes 100 cc of air.

The separator 10 for a rechargeable battery according to an embodiment may be manufactured by a suitable method. For example, the separator 10 may be formed by coating a composition for forming a heat resistance layer on one surface or both surfaces of the porous substrate 20 and drying the same.

The composition for forming a heat resistance layer may include the acryl-based copolymer, the alkali metal, the filler, and a solvent. The solvent may be a suitable solvent that dissolves or disperses the acryl-based copolymer and the filler. For example, the solvent may be an environmentally-friendly aqueous solvent including water, an alcohol, or a combination thereof.

The coating may be performed by, for example, spin coating, dip coating, bar coating, die coating, slit coating, roll coating, inkjet printing, or the like.

The drying may be performed through, for example, natural drying, drying with warm air, hot air, or low humid air, vacuum-drying, or radiation of a far-infrared ray, an electron beam, or the like. The drying may be performed at, for example, a temperature of about 25° C. to about 120° C.

The separator 10 for a rechargeable battery may be manufactured by lamination, co-extrusion, or the like, in addition to, or instead of, the methods described above.

Hereinafter, a rechargeable lithium battery including the separator 10 for a rechargeable battery is described.

A rechargeable lithium battery may be classified as a lithium ion battery, a lithium ion polymer battery, or a lithium polymer battery depending on kinds of a separator and an electrolyte. The rechargeable lithium battery may also be classified as cylindrical, prismatic, coin-type, pouch-type, or the like depending on shape. In addition, the rechargeable lithium battery may be a bulk type or a thin film type depending on sizes. Structures and manufacturing methods for lithium ion batteries pertaining to this disclosure are well known in the art.

Figure 2:
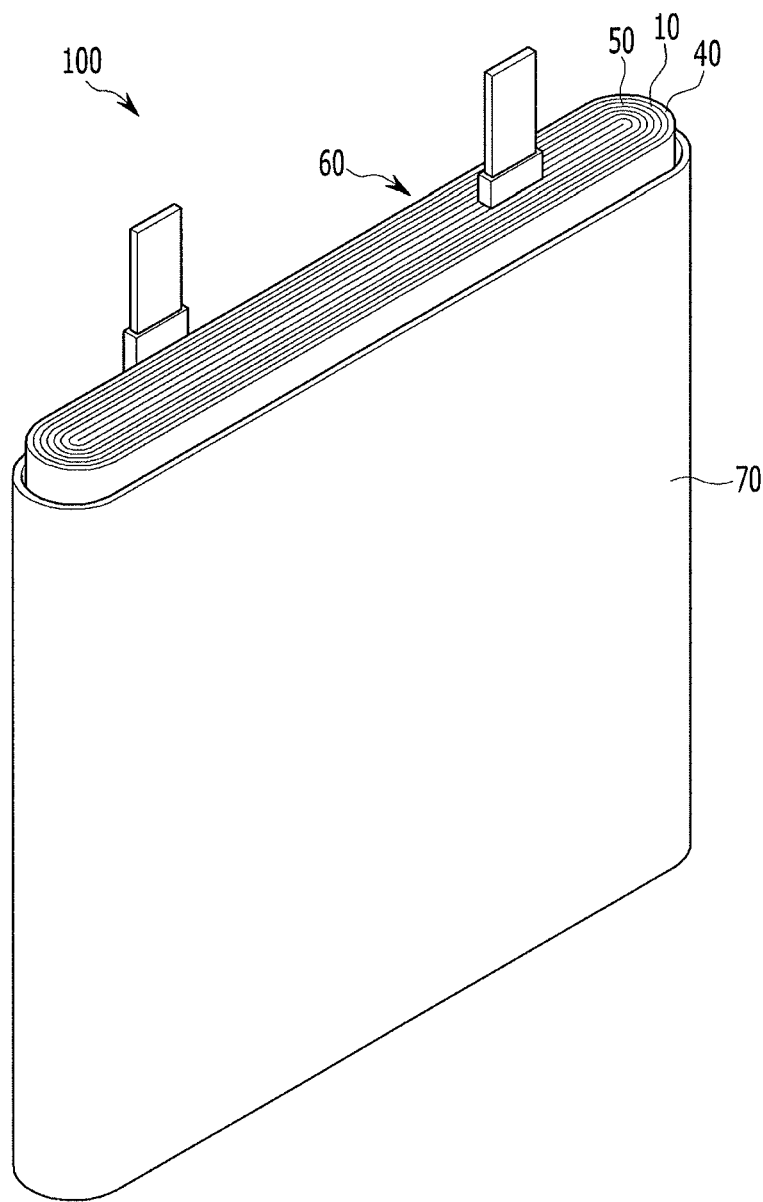
FIG. 2 illustrates an exploded perspective view showing a rechargeable lithium battery according to an embodiment.

Herein, as an example of a rechargeable lithium battery, a prismatic rechargeable lithium battery is described. FIG. 2 illustrates an exploded perspective view showing a rechargeable lithium battery according to an embodiment. Referring to FIG. 2, a rechargeable lithium battery 100 according to an embodiment may include an electrode assembly 60 manufactured by interposing a separator 10 between a positive electrode 40 and a negative electrode 50 and winding the separator 10, positive electrode 40, and negative electrode 50, and a case 70 housing the electrode assembly 60.

The electrode assembly 60 may have, for example, a jelly-roll shape formed by winding the positive electrode 40, the negative electrode 50, and the separator 10 interposed therebetween.

The positive electrode 40, the negative electrode 50, and the separator 10 may be impregnated in an electrolyte solution. The rechargeable lithium battery 100 may include a cap plate or cover to seal the electrode assembly 60 and the electrolyte solution inside the case 70.

The positive electrode 40 may include a positive current collector and a positive active material layer formed on the positive current collector. The positive active material layer may include a positive active material, a binder, and optionally, a conductive material.

The positive current collector may include aluminum, nickel, and the like, as examples.

The positive active material may include a compound being capable of intercalating and deintercalating lithium. For example, at least one of a composite oxide or a composite phosphate of a metal selected from cobalt, manganese, nickel, aluminum, iron, or a combination thereof, and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder may improve binding properties of positive active material particles with one another and with a current collector. Specific examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like. These may be used alone or as a mixture of two or more.

The conductive material may improve conductivity of an electrode. Examples of the conductive material may include natural graphite, artificial graphite, carbon black, a carbon fiber, a metal powder, a metal fiber, or the like. These may be used alone or as a mixture of two or more. The metal powder and the metal fiber may include a metal of copper, nickel, aluminum, silver, or the like, as examples.

The negative electrode 50 may include a negative current collector and a negative active material layer formed on the negative current collector.

The negative current collector may include copper, gold, nickel, a copper alloy, or the like, as examples.

The negative active material layer may include a negative active material, a binder, and optionally, a conductive material. The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material such as a generally-used carbon-based negative active material. Examples thereof may include crystalline carbon, amorphous carbon, or a combination thereof. Examples of the crystalline carbon may include graphite such as amorphous, sheet-shape, flake, spherical shape or fiber-shaped natural graphite or artificial graphite. Examples of the amorphous carbon may include soft carbon or hard carbon, a mesophase pitch carbonized product, fired coke, or the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ ($0<x<2$), a Si—C composite, a Si—Y' alloy, Sn, $SnO_2$, a Sn—C composite, a Sn—Y' alloy, or the like, and at least one of these may be mixed with $SiO_2$. Specific examples of the element Y' may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. (In the Sn—Y' alloy, Y' is not Sn.) The transition metal oxide may be vanadium oxide, lithium vanadium oxide, or the like.

The binder and the conductive material used in the negative electrode 50 may be the same as the binder and conductive material of the positive electrode 40.

The positive electrode 40 and the negative electrode 50 may be manufactured by mixing each active material composition including each active material and a binder, and optionally a conductive material in a solvent, and coating the active material composition onto each current collector. The solvent may be N-methylpyrrolidone, or the like, as an example. The electrode manufacturing method is well known, and thus is not repeated in detail in the present specification.

The electrolyte solution may include an organic solvent a lithium salt.

The organic solvent may serve as a medium for transmitting ions taking part in the electrochemical reaction of a battery. Examples thereof include a carbonate-based solvent, an ester-based solvent, an ether-based solvent, a ketone-based solvent, an alcohol-based solvent, or an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, or the like. The ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, or the like. The ether-based solvent may be dibutyl ether, tetraglyme, diglyme, dimethoxyethane, 2-methyltetrahydrofuran, tetrahydrofuran, or the like. The ketone-based solvent may be cyclohexanone, or the like. The alcohol-based solvent may be ethanol, isopropyl alcohol, or the like. The aprotic solvent may be a nitrile such as R—CN (R is a C2 to C20 linear or branched or cyclic hydrocarbon group, a double bond, an aromatic ring, or an ether bond), or the like, an amide such as dimethyl formamide, a dioxolane such as 1,3-dioxolane, a sulfolane, or the like.

The organic solvent may be used alone or in a mixture of two or more. When the organic solvent is used in a mixture of two or more, the mixture ratio may be controlled in accordance with a desirable cell performance.

The lithium salt may be dissolved in an organic solvent. The lithium salt may supply lithium ions in a battery, basically operate the rechargeable lithium battery, and improve lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Synthesis Example: Preparation of Acryl-Based Copolymer

Synthesis Example 1

Distilled water (968 g), acrylic acid (45.00 g, 0.62 mol), ammonium persulfate (0.54 g, 2.39 mmol, 1500 ppm based on monomers), 2-acrylamido-2-methylpropane sulfonic acid (5.00 g, 0.02 mol), and a 5 N sodium hydroxide aqueous solution (0.8 equivalent based on a total amount of the acrylic acid and the 2-acrylamido-2-methylpropane sulfonic acid) were put into a 3 L four-necked flask equipped with a stirrer, a thermometer, and a condenser. After three repetitions of reducing an internal pressure in the flask into 10 mmHg with a diaphragm pump and recovering it into a normal pressure with nitrogen, acrylonitrile (50.00 g, 0.94 mol) was added thereto.

The reaction solution was controlled to have a stable temperature in a range of 65° C. to 70° C. and reacted for 18 hours. Ammonium persulfate (0.23 g, 1.00 mmol, 630 ppm based on a monomer) was secondarily added thereto, and the obtained mixture was heated up to 80° C. and reacted again for 4 hours. After cooling the temperature down to room temperature, the reaction solution was adjusted to have pH in a range of 7 to 8 by using a 25% ammonia aqueous solution.

A poly(acrylic acid-co-acrylonitrile-co-2-acrylamido-2-methylpropane sulfonic acid) sodium salt was prepared in this method. The acrylic acid, the acrylonitrile, and the 2-acrylamido-2-methylpropane sulfonic acid were used in a mole ratio of 39:59:2. About 10 mL of the reaction solution (a reaction product) was taken to measure a non-volatile component, and the result was 9.0% (a theoretical value: 10%).

Synthesis Example 2

An acryl-based copolymer was manufactured according to the same method as Synthesis Example 1 except for using acrylic acid (40 g, 0.56 mol), acrylonitrile (50 g, 0.94 mol), and 2-acrylamido-2-methylpropane sulfonic acid (10 g, 0.05 mol). The acrylic acid, the acrylonitrile, and the 2-acrylamido-2-methylpropane sulfonic acid were used in a mole ratio of 36:61:3. The reaction solution included a non-volatile component of 9.0% (a theoretical value: 10%).

Synthesis Example 3

An acryl-based copolymer was manufactured according to the same method as Synthesis Example 1 except for using acrylic acid (35 g, 0.49 mol), acrylonitrile (50 g, 0.94 mol), and 2-acrylamido-2-methylpropane sulfonic acid (15 g, 0.07 mol). The acrylic acid, the acrylonitrile, and the 2-acrylamido-2-methylpropane sulfonic acid were used in a mole ratio of 32:63:5. The reaction solution included a non-volatile component of 9.0% (a theoretical value: 10%).

Synthesis Example 4

An acryl-based copolymer was manufactured according to the same method as Synthesis Example 1 except for using acrylic acid (30 g, 0.42 mol), acrylonitrile (50 g, 0.94 mol), and 2-acrylamido-2-methylpropane sulfonic acid (20 g, 0.10 mol). The acrylic acid, the acrylonitrile, and the 2-acrylamido-2-methylpropane sulfonic acid were used in a mole ratio of 28:65:7. The reaction solution included a non-volatile component of 9.0% (a theoretical value: 10%).

Synthesis Example 5

An acryl-based copolymer was manufactured according to the same method as Synthesis Example 1 except for using acrylic acid (32 g, 0.49 mol), acrylonitrile (60 g, 1.13 mol), and 2-acrylamido-2-methylpropane sulfonic acid (5 g, 0.02 mol). The acrylic acid, the acrylonitrile, and the 2-acrylamido-2-methylpropane sulfonic acid were used in a mole ratio of 30:69:1. The reaction solution included a non-volatile component of 9.0% (a theoretical value: 10%).

Synthesis Example 6

An acryl-based copolymer was manufactured according to the same method as Synthesis Example 1 except for using acrylic acid (30 g, 0.42 mol), acrylonitrile (60 g, 1.13 mol), and 2-acrylamido-2-methylpropane sulfonic acid (10 g, 0.05 mol). The acrylic acid, the acrylonitrile, and the 2-acrylamido-2-methylpropane sulfonic acid were used in a mole ratio of 26:71:3. The reaction solution included a non-volatile component of 9.0% (a theoretical value: 10%).

Synthesis Example 7

An acryl-based copolymer was manufactured according to the same method as Synthesis Example 1 except for using acrylic acid (25 g, 0.35 mol), acrylonitrile (60 g, 1.13 mol), and 2-acrylamido-2-methylpropane sulfonic acid (15 g, 0.07 mol). The acrylic acid, the acrylonitrile, and the 2-acrylamido-2-methylpropane sulfonic acid were used in a mole ratio of 22:73:5. The reaction solution included a non-volatile component of 9.0% (a theoretical value: 10%).

Synthesis Example 8

An acryl-based copolymer was manufactured according to the same method as Synthesis Example 1 except for using acrylic acid (20 g, 0.28 mol), acrylonitrile (60 g, 1.13 mol), and 2-acrylamido-2-methylpropane sulfonic acid (20 g, 0.10 mol). The acrylic acid, the acrylonitrile, and the 2-acrylamido-2-methylpropane sulfonic acid were used in a mole ratio of 18:75:7. The reaction solution included a non-volatile component of 9.0% (a theoretical value: 10%).

Comparative Synthesis Example 1

An acryl-based copolymer was manufactured according to the same method as Synthesis Example 1 except for using acrylic acid (50 g, 0.69 mol) and acrylonitrile (50 g, 0.94 mol) but not using 2-acrylamido-2-methylpropane sulfonic acid. The acrylic acid and the acrylonitrile were used in a mole ratio of 42:58. The reaction solution included a non-volatile component of 9.0% (a theoretical value: 10%).

Comparative Synthesis Example 2

An acryl-based copolymer was manufactured according to the same method as Synthesis Example 1 except for using acrylic acid (50 g, 0.69 mol) and 2-acrylamido-2-methylpropane sulfonic acid (50 g, 0.24 mol) but not using acrylonitrile. The acrylic acid and the acrylamido-2-methylpropane sulfonic acid were used in a mole ratio of 74:26. The reaction solution included a non-volatile component of 9.0% (a theoretical value: 10%).

Comparative Synthesis Example 3

An acryl-based copolymer was manufactured according to the same method as Synthesis Example 1 except for not using a sodium hydroxide aqueous solution.

Table 1 shows mole ratios, weight average molecular weights, and glass transition temperatures of monomers of each acryl-based copolymer according to Synthesis Examples 1 to 8 and Comparative Synthesis Examples 1 to 3.

TABLE 1

|  | Mole ratio of monomers | | | Weight average molecular weight (g/mol) | Glass transition temperature (° C.) |
| --- | --- | --- | --- | --- | --- |
|  | AA | AN | AMPS | | |
| Synthesis Example 1 | 39 | 59 | 2 | 310,000 | 280 |
| Synthesis Example 2 | 36 | 61 | 3 | 302,000 | 277 |
| Synthesis Example 3 | 32 | 63 | 5 | 304,000 | 275 |
| Synthesis Example 4 | 28 | 65 | 7 | 311,000 | 271 |
| Synthesis Example 5 | 30 | 69 | 1 | 285,000 | 265 |
| Synthesis Example 6 | 26 | 71 | 3 | 298,000 | 263 |
| Synthesis Example 7 | 22 | 73 | 5 | 305,000 | 232 |
| Synthesis Example 8 | 18 | 75 | 7 | 314,000 | 260 |
| Comparative Synthesis Example 1 | 42 | 58 | — | 320,000 | 278 |
| Comparative Synthesis Example 2 | 74 | — | 26 | 293,000 | 305 |
| Comparative Synthesis Example 3 | 39 | 59 | 2 | 161,000 | 98 |

In Table 1, AA indicates acrylic acid, AN indicates acrylonitrile, and AMPS indicates 2-acrylamido-2-methylpropane sulfonic acid. The glass transition temperature was measured through a differential scanning calorimetry analysis Example: Manufacture of Separator for Rechargeable Battery Cell Example 1-1

The acryl-based polymer (diluting to 10 wt % in distilled water) according to Synthesis Example 1 and boehmite (an average particle diameter: 600 nm, AOH60, Nabaltec AG) in a mass ratio of 1:20 were mixed with a water solvent and then, milled therewith at 25° C. for 30 minutes with a bead mill. Water was added thereto until a total solid content became 20 wt % to prepare a composition for forming a heat resistance layer. The composition for forming a heat resistance layer was die-coated to be 3 μm thick to be on a cross section of a 12.5 μm-thick polyethylene porous substrate (permeability: 113 sec/100 cc, puncture strength: 360 kgf, SK) and then, dried at 70° C. for 10 minutes to manufacture a separator for a rechargeable battery cell.

Example 1-2

A separator for a rechargeable battery was manufactured according to the same method as Example 1-1 except for using the acryl-based polymer of Synthesis Example 1 and boehmite in a mass ratio of 1:40.

Example 1-3

A separator for a rechargeable battery was manufactured according to the same method as Example 1-1 except for using 75 wt % of boehmite (an average particle diameter: 600 nm, AOH60, Nabaltec AG) and 25 wt % of boehmite (an average particle diameter: 350 nm, 200SM, Nabaltec AG) as a filler. The mass ratio of the acryl-based polymer of Synthesis Example 1 and the filler was 1:20.

Example 1-4

25 wt % of an inorganic dispersion was first prepared by adding boehmite (an average particle diameter: 600 nm, AOH60, Nabaltec AG) and a polyacryl-based dispersing agent corresponding to 1.0 wt % of the boehmite to water as a solvent and milling the mixture at 25° C. for 30 minutes. Then, a separator for a rechargeable battery was manufactured according to the same method as Example 1-1 except for preparing a composition for forming a heat resistance layer by adding the acryl-based polymer of Synthesis Example 1 and the boehmite in a mass ratio of 1:20 to the inorganic dispersion and adding water thereto such that a total solid in the composition became 20 wt %.

Example 2

A separator for a rechargeable battery was manufactured according to the same method as Example 1-1 except for using the acryl-based polymer of Synthesis Example 2 instead of the acryl-based polymer of Synthesis Example 1.

Example 3

A separator for a rechargeable battery was manufactured according to the same method as Example 1-1 except for using the acryl-based polymer of Synthesis Example 3 instead of the acryl-based polymer of Synthesis Example 1.

Example 4

A separator for a rechargeable battery was manufactured according to the same method as Example 1-1 except for using the acryl-based polymer of Synthesis Example 4 instead of the acryl-based polymer of Synthesis Example 1.

Example 5

A separator for a rechargeable battery was manufactured according to the same method as Example 1-1 except for using the acryl-based polymer of Synthesis Example 5 instead of the acryl-based polymer of Synthesis Example 1.

Example 6

A separator for a rechargeable battery was manufactured according to the same method as Example 1-1 except for using the acryl-based polymer of Synthesis Example 6 instead of the acryl-based polymer of Synthesis Example 1.

Example 7

A separator for a rechargeable battery was manufactured according to the same method as Example 1-1 except for using the acryl-based polymer of Synthesis Example 7 instead of the acryl-based polymer of Synthesis Example 1.

Example 8

A separator for a rechargeable battery was manufactured according to the same method as Example 1-1 except for using the acryl-based polymer of Synthesis Example 8 instead of the acryl-based polymer of Synthesis Example 1.

Comparative Example 1

A separator for a rechargeable battery was manufactured according to the same method as Example 1-1 except for using the acryl-based polymer of Comparative Synthesis Example 1 instead of the acryl-based polymer of Synthesis Example 1.

Comparative Example 2

A separator for a rechargeable battery was manufactured according to the same method as Example 1-1 except for using the acryl-based polymer of Comparative Synthesis Example 2 instead of the acryl-based polymer of Synthesis Example 1.

Comparative Example 3

A separator for a rechargeable battery was manufactured according to the same method as Example 1-1 except for using the acryl-based polymer of Comparative Synthesis Example 3 instead of the acryl-based polymer of Synthesis Example 1.

Evaluation Example 1: Air Permeability

With regard to each of the separators for a rechargeable battery according to Examples 1 to 8 and Comparative Examples 1 to 3 the time in seconds for 100 cc of air to be passed through the separator was measured using a permeability measuring device (Asahi Seiko Co., Ltd., EG01-55-1MR). The results are shown in Table 2.

Evaluation Example 2: Thermal Shrinkage Ratio

The separators for a rechargeable battery according to Examples 1 to 8 and Comparative Examples 1 to 3 were respectively cut into a size of 8 cm×8 cm to prepare samples. The samples after drawing a 5 cm×5 cm-size quadrangle on the surface were inserted between paper or alumina powder, allowed to stand at 150° C. in an oven for 1 hour, and taken out of the oven. The shrinkage ratio of each sampling machine direction (MD) and in a traverse direction (TD) was calculated by measuring sides of the quadrangles drawn on the samples. The results are shown in Table 2.

Evaluation Example 3: Resistance to Fracture Upon Heating

The separators for a rechargeable battery according to Examples 1 to 8 and Comparative Examples 1 to 3 were respectively cut into a size of 5 cm×5 cm to obtain samples. The samples were respectively attached on a cardboard having a 4 cm×4 cm-sized hole by using a polyimide film and put in each oven heated up to 200° C., 230° C., and 250° C. The samples were taken out of the ovens after 10 minutes to examine whether or not the samples were fractured. The results are shown in Table 2. In Table 2, O represents a fractured sample, and X represents a sample that was not fractured.

TABLE 2

| | Mole ratio of each monomer of acryl-based copolymer | | | Solid content of composition for forming a heat resistance layer (wt %) | Mass ratio of acryl-based copolymer and boehmite | Thickness of heat resistance layer (μm) | Air permeability of separator (sec/100 cc) | Thermal shrinkage of separator (%) | Resistance to fracture upon heating | | |
|---|---|---|---|---|---|---|---|---|---|---|---|
| | AA | AN | AMPS | | | | | | 200° C. | 230° C. | 250° C. |
| Example 1-1 | 39 | 59 | 2 | 20 | 1:20 | 3 | 145 | MD: 5 TD: 3 | X | X | X |
| Example 1-2 | 39 | 59 | 2 | 20 | 1:40 | 3 | 133 | MD: 3 TD: 2 | X | X | O |
| Example 1-3 | 39 | 59 | 2 | 20 | 1:20 | 3 | 135 | MD: 2 TD: 2 | X | X | X |
| Example 1-4 | 39 | 59 | 2 | 20 | 1:20 | 3 | 146 | MD: 4 TD: 3 | X | X | X |

TABLE 2-continued

| | Mole ratio of each monomer of acryl-based copolymer | | | Solid content of composition for forming a heat resistance layer (wt %) | Mass ratio of acryl-based copolymer and boehmite | Thickness of heat resistance layer (μm) | Air permeability of separator (sec/100 cc) | Thermal shrinkage of separator (%) | Resistance to fracture upon heating | | |
|---|---|---|---|---|---|---|---|---|---|---|---|
| | AA | AN | AMPS | | | | | | 200° C. | 230° C. | 250° C. |
| Example 2 | 36 | 31 | 3 | 20 | 1:20 | 3 | 151 | MD: 4 TD: 3 | X | X | X |
| Example 3 | 32 | 63 | 5 | 20 | 1:20 | 3 | 137 | MD: 4 TD: 3 | X | X | X |
| Example 4 | 28 | 65 | 7 | 20 | 1:20 | 3 | 143 | MD: 4 TD: 3 | X | X | X |
| Example 5 | 30 | 69 | 1 | 20 | 1:20 | 3 | 142 | MD: 4 TD: 3 | X | X | X |
| Example 6 | 26 | 71 | 3 | 20 | 1:20 | 3 | 152 | MD: 4 TD: 3 | X | X | X |
| Example 7 | 22 | 73 | 5 | 20 | 1:20 | 3 | 143 | MD: 4 TD: 3 | X | X | X |
| Example 8 | 18 | 75 | 7 | 20 | 1:20 | 3 | 138 | MD: 4 TD: 3 | X | X | X |
| Comparative Example 1 | 42 | 58 | — | 20 | 1:20 | 3 | 141 | MD: 8 TD: 7 | X | ○ | ○ |
| Comparative Example 2 | 74 | — | 26 | 20 | 1:20 | 3 | 158 | MD: 15 TD: 13 | ○ | ○ | ○ |
| Comparative Example 3 | 39 | 59 | 2 | 20 | 1:20 | 3 | 171 | MD: 25 TD: 22 | ○ | ○ | ○ |

Referring to Table 2, the separators according to Examples showed excellent permeability of less than or equal to 152 sec/100 cc, a shrinkage ratio of less than or equal to 5% at 150° C., and non-fracture characteristics even at 200° C. to 250° C., and thus, exhibited excellent heat resistance and thermal stability. On the other hand, the separator of Comparative Example 1 showed a remarkably high thermal shrinkage ratio after allowed to stand at 150° C. for 1 hour and also, was fractured at temperatures greater than or equal to 200° C. and thus showed insufficient heat resistance at a high temperature. The separators of Comparative Examples 2 to 3 showed insufficient permeability and a remarkably high thermal shrinkage ratio after allowed to stand at 150° C. for 1 hour and were fractured at temperatures greater than or equal to 200° C.

Preparation Examples 1-1 to 1-4 and 2 to 8 and Comparative Preparation Examples 1 to 3: Manufacture of Rechargeable Lithium Battery Cells $LiCoO_2$, polyvinylidene fluoride, and carbon black in a weight ratio of 96:2:2 were added to N-methylpyrrolidone solvent to prepare a slurry. The slurry was coated onto an aluminum thin film and then, dried and compressed to manufacture a positive electrode.

Graphite, polyvinylidene fluoride, and carbon black in a weight ratio of 98:1:1 were added to an N-methylpyrrolidone solvent to prepare a slurry. The slurry was coated onto a copper foil and then, dried and compressed to manufacture a negative electrode.

The separators according to Examples and Comparative Examples were respectively interposed between the positive and negative electrodes and wound therewith to manufacture jelly-roll type electrode assemblies. Then, an electrolyte solution prepared by mixing ethylene carbonate, ethylmethyl carbonate, and diethyl carbonate in a volume ratio of 3:5:2 and adding 1.15 M $LiPF_6$ to the mixed solvent was injected into respective battery cases, and the cases were sealed to manufacture rechargeable lithium battery cells.

Evaluation Example 4: Cycle-Life Characteristics of Battery Cell

Figure 3:
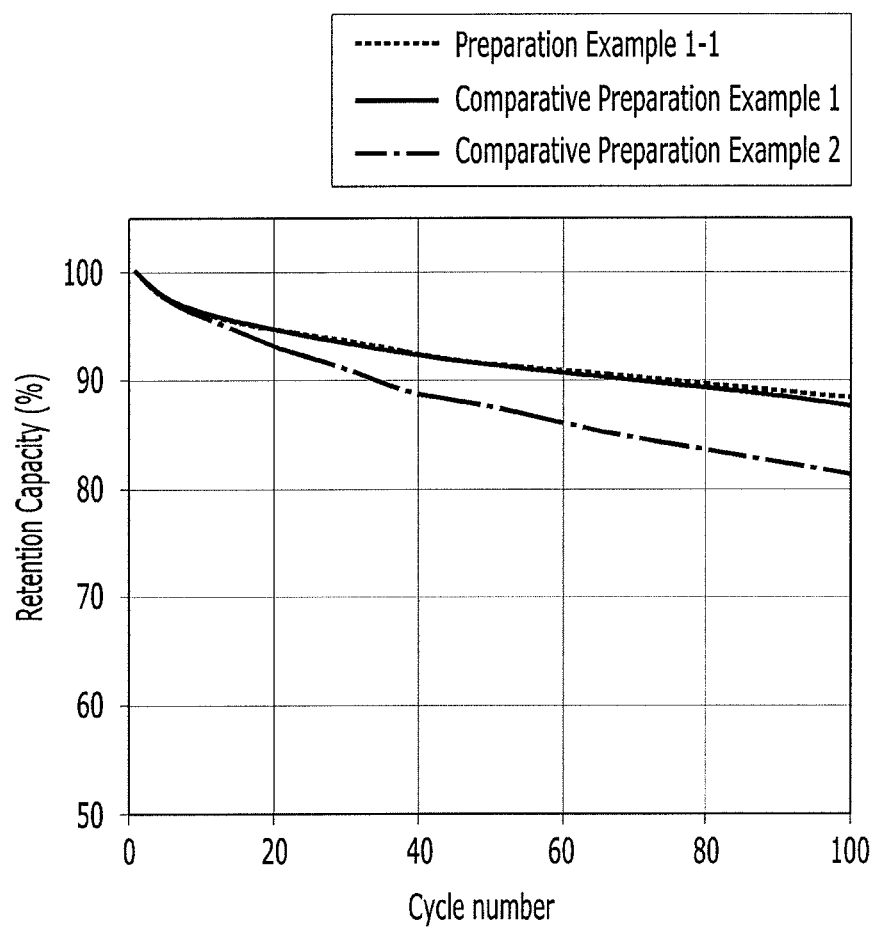
FIG. 3 illustrates a graph showing cycle-life characteristics of the rechargeable lithium battery cells of Preparation Example 1-1, Comparative Preparation Example 1, and Comparative Preparation Example 2.

With regard to cells manufactured by applying a respective separator of Example 1-1 and Comparative Examples 1 and 2 according to Preparation Example 1-1 and Comparative Preparation Examples 1 and 2, the capacity recovery rate of each of the depending on a cycle number was evaluated. The results are shown in FIG. 3.

Charge: CC 1.0 C to 4.4 V, CV to 0.01 C
Discharge: CC 1.0 C to 2.75 V
Referring to FIG. 3, the cell of Preparation Example 1-1 showed remarkably excellent cycle-life characteristics.

Evaluation Example 5: Rate Capability of Battery Cell

Figure 4:
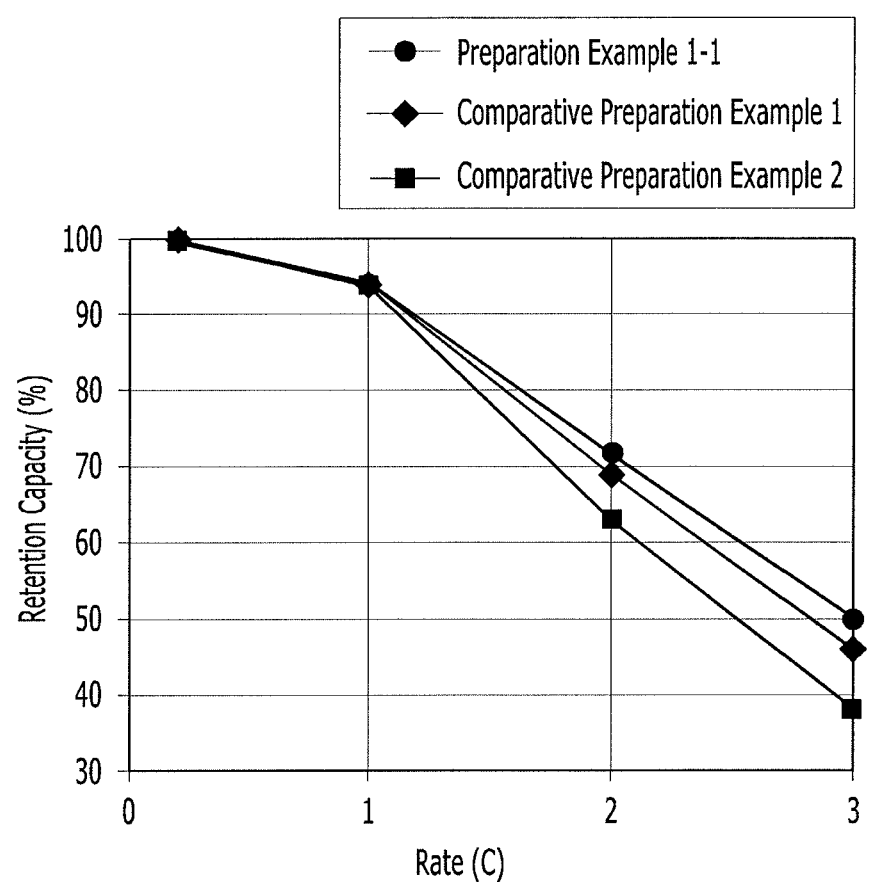
FIG. 4 illustrates a graph showing the rate capability of the rechargeable lithium battery cells according to Preparation Example 1-1, Comparative Preparation Example 1, and Comparison Preparation Example 2.

With regard to cells manufactured by applying the separators of Example 1-1 and Comparative Examples 1 and 2 according to Preparation Example 1-1 and Comparative Preparation Examples 1 and 2, the capacity recovery rate of each of the cells depending on a C-rate was evaluated, and the results are shown in FIG. 4.

Charge: CC 1.0 C to 4.4 V, CV to 0.01 C
Discharge: CC 1.0 C, 2.0 C, 3.0 C to 2.75 V
Referring to FIG. 4, the cell of Preparation Example 1-1 showed remarkably excellent rate capability.

Evaluation Example 6: Linear Sweep Voltammetry (LSV) Evaluation

In order to evaluate the oxidation resistance of acryl-based binders according to Synthesis Example 1 and Comparative Synthesis Examples 1 and 2 and a polyvinylidene fluoride-based binder (Solef® 5130, Solvay S.A.), 90 wt % of a carbon material (SFG6) and 10 wt % of a respective acryl-based binder of Synthesis Example 1 and Comparative Synthesis Examples 1 and 2 and a polyvinylidene fluoride-based binder (Solef® 5130, Solvay S.A.) were coated onto a platinum (Pt) electrode to manufacture an electrode. An oxidation resistance test was conducted by using an electrolyte solution prepared by dissolving 1.3 M LiPF$_6$ in a mixed solvent of ethylene carbonate/ethylmethyl carbonate/dimethyl carbonate in a weight ratio of 30/50/20. A current-potential curved line was obtained by changing a potential at 30° C. under a condition of 0.005 V/sec. The results are shown in FIG. 5.

Figure 5:
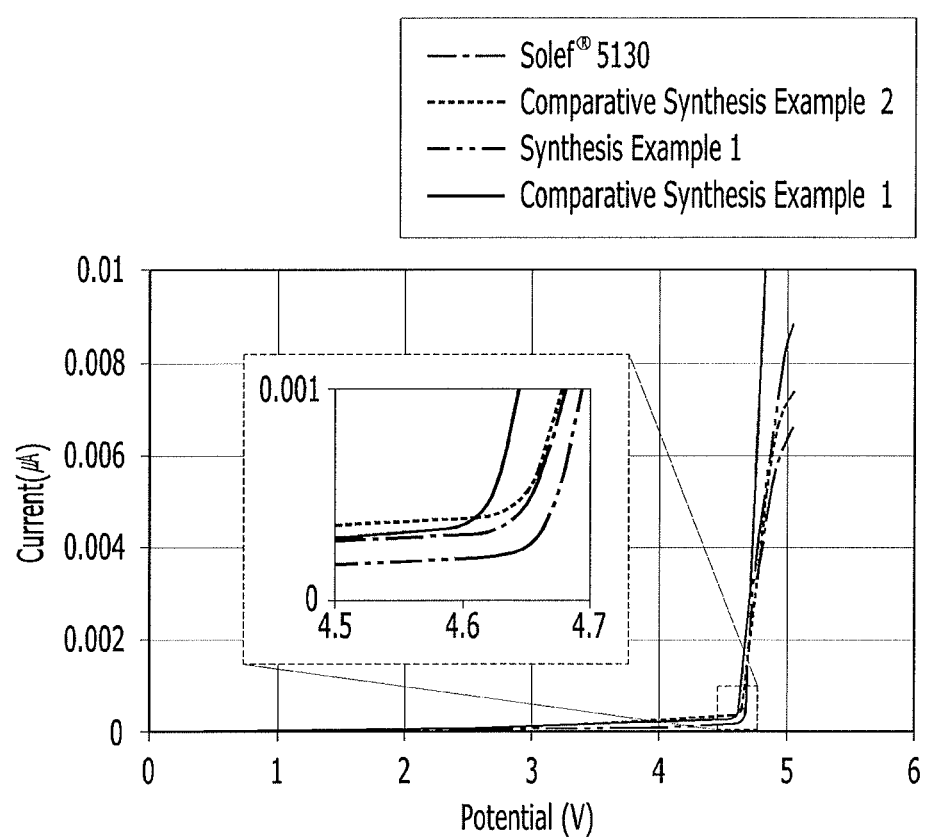
FIG. 5 illustrates a linear sweep voltammetry evaluation graph showing oxidation resistances of the acryl-based binder and the polyvinylidene fluoride-based binder prepared in Synthesis Example 1, Comparative Synthesis Example 1, and Comparative Synthesis Example 2.

Referring to FIG. 5, Synthesis Example 1 showed a potential change at 4.65 V, Comparative Synthesis Example 1 showed a potential change at 4.61 V, and Comparative Synthesis Example 2 showed a potential change at 4.64 V, and the polyvinylidene fluoride-based binder showed a potential change at 4.63 V. Since a potential change is generally caused by decomposition of a binder, the results show that the binder of Synthesis Example 1 showed excellent oxidation resistance.

By way of summation and review, when a battery is exposed to a high temperature environment due to abnormal behavior, there is a risk that a separator may mechanically shrink or may be damaged due to melting characteristics at a low temperature. In this case, the positive and negative electrodes could contact each other to cause an explosion of the battery. In order to address this issue, technology for suppressing shrinkage of a separator and ensuring stability is desirable.

A general method of increasing thermal resistance of the separator may include coating the separator with a mixture of inorganic particles having a large thermal resistance and an organic binder having adherence. However, the general method may not sufficiently secure desired adherence and may not be uniformly applicable to variously-sized separators.

Embodiments provide a separator for a rechargeable battery that provides high heat resistance and strong adherence. Embodiments provide a rechargeable lithium battery including the separator and having improved heat resistance, stability, cycle-life characteristics, rate capability, oxidation resistance, and the like.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A separator for a rechargeable battery, the separator comprising:
    a porous substrate and a heat resistance layer on at least one surface of the porous substrate, wherein:
    the heat resistance layer includes an acryl-based copolymer, an alkali metal, and a filler, repeating units of the acryl-based copolymer consisting of (i) a unit derived from (meth)acrylate or (meth)acrylic acid, (ii) a cyano group-containing unit, and (iii) a sulfonate group-containing unit, wherein:
    the unit derived from (meth)acrylate or (meth)acrylic acid is represented by Chemical Formula 1, Chemical Formula 2, Chemical Formula 3, or a combination thereof:

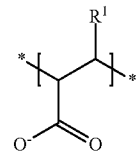

[Chemical Formula 1]

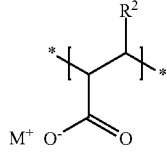

[Chemical Formula 2]

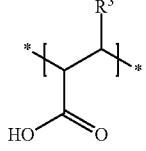

[Chemical Formula 3]

wherein, in Chemical Formula 1, Chemical Formula 2, $R^1$, $R^2$, and $R^3$ are independently hydrogen or a methyl group, and in Chemical Formula 2, M is an alkali metal; and the sulfonate group-containing unit is represented by Chemical Formula 5, Chemical Formula 6, Chemical Formula 7, or a combination thereof:

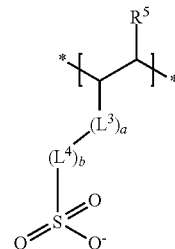

[Chemical Formula 5]

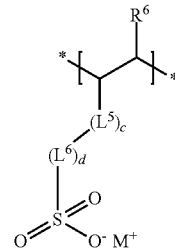

[Chemical Formula 6]

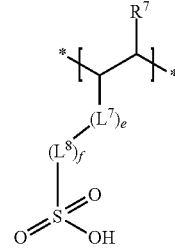

[Chemical Formula 7]

wherein, in Chemical Formula 5, Chemical Formula 6, and Chemical Formula 7, $R^5$, $R^6$, and $R^7$ are independently hydrogen or a C1 to C3 alkyl group, $L^3$, $L^5$, and $L^7$ are independently —C(=O)—, —C(=O)O—, —OC(=O)—, —O—, or —C(=O)NH—, $L^4$, $L^6$, and $L^8$ are independently substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and a, b, c, d, e, and f are independently an integer ranging from 0 to 2, and in Chemical Formula 6, M' is an alkali metal, the acryl-based copolymer has a glass transition temperature of 232° C. to about 280° C., and the sulfonate group-containing unit is included in an amount of more than or equal to about 0.1 mol % and less than about 10 mol %.

2. The separator as claimed in claim 1, wherein the cyano group-containing unit is represented by Chemical Formula 4:

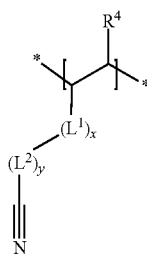

[Chemical Formula 4]

wherein, in Chemical Formula 4, $R^4$ is hydrogen or a C1 to C3 alkyl group, $L^1$ is —C(=O)—, —C(=O)O—, —OC(=O)—, —O—, or —C(=O)NH—, x is an integer ranging from 0 to 2, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and y is an integer ranging from 0 to 2.

3. The separator as claimed in claim 1, wherein in the acryl-based copolymer, the unit derived from (meth)acrylate or (meth)acrylic acid is included in an amount of about 10 mol % to about 70 mol %, the cyano group-containing unit is included in an amount of about 30 mol % to about 85 mol %, and the sulfonate group-containing unit is included in an amount of more than or equal to about 0.1 mol % and less than about 10 mol %, such that a total mol % of the unit derived from (meth)acrylate or (meth)acrylic acid, the cyano group-containing unit, and the sulfonate group-containing unit is 100 mol %.

4. The separator as claimed in claim 1, wherein a weight average molecular weight of the acryl-based copolymer is about 200,000 to about 700,000.

5. The separator as claimed in claim 1, wherein in the heat resistance layer, the acryl-based copolymer is included in an amount of about 1 wt % to about 30 wt %.

6. The separator as claimed in claim 1, wherein the alkali metal is included in an amount of about 1 wt % to about 40 wt % based on a total weight of the alkali metal and the acryl-based copolymer.

7. The separator as claimed in claim 1, wherein the filler is included in an amount of about 70 wt % to about 99 wt % based on the heat resistance layer.

8. The separator as claimed in claim 1, wherein the filler includes $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

9. The separator as claimed in claim 1, wherein a thickness of the heat resistance layer is about 1 μm to about 5 μm.

10. The separator as claimed in claim 1, wherein after the separator is allowed to stand at about 130° C. to about 170° C. for about 20 minutes to about 70 minutes, a shrinkage ratio of the separator in each of a machine direction (MD) and a traverse direction (TD) is less than or equal to about 5%.

11. A rechargeable lithium battery comprising
a positive electrode, a negative electrode, and the separator as claimed in claim 1 disposed between the positive electrode and the negative electrode.

12. The battery as claimed in claim 11, wherein:
the unit derived from (meth)acrylate or (meth)acrylic acid is included in the acryl-based copolymer in an amount of about 10 mol % to about 70 mol %,
the cyano group-containing unit is included in the acryl-based copolymer in an amount of about 30 mol % to about 85 mol %,
the sulfonate group-containing unit is included in the acryl-based copolymer in an amount of more than or equal to about 0.1 mol % and less than about 10 mol %, such that a total mol % of the unit derived from (meth)acrylate or (meth)acrylic acid, the cyano group-containing unit, and the sulfonate group-containing unit is 100 mol %,
the cyano group-containing unit is represented by Chemical Formula 4:

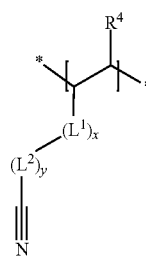

[Chemical Formula 4]

wherein, in Chemical Formula 4, $R^4$ is hydrogen or a C1 to C3 alkyl group, $L^1$ is —C(=O)—, —C(=O)O—, —OC(=O)—, —O—, or —C(=O)NH—, x is an integer ranging from 0 to 2, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and y is an integer ranging from 0 to 2,
a weight average molecular weight of the acryl-based copolymer is about 200,000 to about 700,000, and
the acryl-based copolymer has a glass transition temperature of 260° C. to about 280° C.

13. The separator as claimed in claim 1, wherein the acryl-based copolymer has a glass transition temperature of 260° C. to about 280° C.

14. The separator as claimed in claim 1, wherein:
the unit derived from (meth)acrylate or (meth)acrylic acid includes acrylic acid and is included in the acryl-based copolymer in an amount of about 18 mol % to about 39 mol %, the cyano group-containing unit includes acrylonitrile and is included in the acryl-based copolymer in an amount of about 59 mol % to about 75 mol %, the sulfonate group-containing unit includes acrylamido-2-methylpropane sulfonic acid and is included in the acryl-based copolymer in an amount of about 1 mol % to about 7 mol %, such that a total mol % of the unit derived from (meth)acrylate or (meth)acrylic acid, the cyano group-containing unit, and the sulfonate group-containing unit is 100 mol %.

* * * * *